United States Patent [19]

Krause et al.

[11] Patent Number: 5,534,582

[45] Date of Patent: Jul. 9, 1996

[54] METAL/PLASTICS COMPOSITE CONTAINING INORGANIC FILLERS AND PROCESSES FOR THE PRODUCTION THEREOF

[75] Inventors: Siegfried Krause; Leonidas Kiriazis, both of Münster, Germany

[73] Assignee: BASF Lacke + Farben, AG, Muenster-Hiltrup, Germany

[21] Appl. No.: 232,183

[22] PCT Filed: Nov. 6, 1992

[86] PCT No.: PCT/EP92/02546

§ 371 Date: May 25, 1994

§ 102(e) Date: May 25, 1994

[87] PCT Pub. No.: WO93/10174

PCT Pub. Date: May 27, 1993

[30] Foreign Application Priority Data

Nov. 12, 1991 [DE] Germany .......................... 41 37 139.9

[51] Int. Cl.⁶ ................. C08J 5/10; C08K 3/08; C08L 23/10
[52] U.S. Cl. .................. 524/441; 524/439; 524/440; 428/323; 428/328; 428/461; 428/425.8; 428/425.9
[58] Field of Search ...................... 524/437, 433, 524/432, 440, 441, 439; 428/323, 328, 461, 425.8, 425.9

[56] References Cited

U.S. PATENT DOCUMENTS

| | | | |
|---|---|---|---|
| 4,268,473 | 5/1981 | Bower et al. | 264/234 |
| 4,303,708 | 12/1981 | Gebhardt et al. | 428/35 |
| 4,310,578 | 1/1982 | Katsura et al. | 428/35 |

FOREIGN PATENT DOCUMENTS

| | | | |
|---|---|---|---|
| 1043931 | 6/1920 | Canada | 400/77 |
| 0031701 | 12/1980 | European Pat. Off. . | |
| 1408981 | 4/1973 | United Kingdom | C08K 3/08 |

*Primary Examiner*—Paul R. Michl
*Assistant Examiner*—U. K. Rajguru
*Attorney, Agent, or Firm*—Anne Gerry Sabourin

[57] ABSTRACT

Thermoplastics film containing inorganic fillers, metal/plastics composite containing inorganic fillers and process for the production thereof.

The present invention relates to thermoplastics films, which contain at least 0.1% by weight, preferably 0.5 to 6% by weight, based on the total weight of the mixture of plastics and filler, of one or more metal powders, selected from aluminum powder, magnesium powder, zinc powder and manganese powder. The invention further relates to metal/plastics composites containing these metal powders, and processes for the production of the thermoplastics films and the metal/plastics composites. The plastics films and the metal/plastics composites are used for producing packaging containers.

6 Claims, No Drawings

METAL/PLASTICS COMPOSITE CONTAINING INORGANIC FILLERS AND PROCESSES FOR THE PRODUCTION THEREOF

BACKGROUND OF THE INVENTION

1. Field of the Invention

The present invention relates to thermoplastics films containing inorganic fillers, to metal/plastics composites containing inorganic fillers and to processes for the production thereof.

For manufacturing a can or a closure for use as packaging material, especially for packaging of foodstuffs, sheets of tinplate, chromated steel such as ECCS (electrolytic chromium-coated steel) and aluminum are coated in sheet or strip form. The coating layer acts as protective layer to protect the metal against the attack of the filled material and the corrosion resulting from this, on the one hand, and, on the other hand, to prevent corrosion products of the metal affecting the filled material. Naturally, the coating layer itself, must not leach coating components which would negatively effect the filled material, either during the sterilization of the filled material, which is carried out subsequent to the filling, or during the subsequent storage of the packaged goods, especially foodstuffs.

Furthermore, the coating components must be resistant to stresses occurring during the further processing of the coated sheets to form cans or closures, such as during deforming, stamping, crimping, beading and the like.

2. Description of the Related Art

The film coating of metal sheets has proven an advantageous process for the coating of sheets, especially for manufacturing foodstuff packagings. Thus, for example, German Laid-Open Applications 3128641 describes a process for producing laminates for foodstuffs packagings, in which the metal sheet and a thermoplastic resin film together with an adhesive based on a carboxyl group-containing polyolefin disposed between these layers are heated to temperatures above the melting point of the adhesive and then cooled together with the application of pressure, producing the metal/plastics composite.

Furthermore laminates and foodstuffs packaging containers, especially bags, produced from these laminates are known from German Laid-Open Application 2912023, GB-A-2027391 and EP-B-31701.

Opaque films of organic thermoplastics are known from EP-A-4633, which films are oriented by biaxial stretching and contain 1 to 25% by weight, based on the weight of the polymeric plastic, of inorganic particles, such as, for example, titanium dioxide, calcium carbonate and silicon dioxide. The inorganic particles lead to the opaque appearance of the plastics films.

Finally, EP-A-199 228 relates to composite films, which contain two plastics films bonded with adhesive, at least one of the two films being provided with a metal layer on its inner surface and one of the two plastics films having an opaque appearance on account of microvoids in the film, which are formed by inorganic fillers, such as sulfates, carbonates, silicates or oxides. The composite film is recommended for packaging of oxidation-sensitive foodstuffs and semi-luxury items. The opaque plastics film, which consists essentially of plastic as the main component and filler, is biaxially stretched. The transparent plastics film is also preferably stretched.

These plastics films have poor barrier properties in the non biaxially-stretched state, ie. the plastics films are water vapor permeable, acid permeable and generally gas permeable. As a result of this, undesired corrosion phenomena occur in the sterilization of preserve cans, eg. visible metal sulfide formations on the can.

SUMMARY OF THE INVENTION

The object on which the present invention is based consists in developing plastics films that are suitable for packaging of oxidation-sensitive foodstuffs and do not necessarily have to be biaxially stretched in order to achieve good barrier properties. It should be possible to produce metal/plastics composites from these plastics films, which should also have outstanding barrier properties, especially regarding UV-permeability, water vapor-permeability and gas-permeability as well as especially sulfide-permeability.

This object is surprisingly achieved by a thermoplastics film containing inorganic fillers, which is characterized in that the film contains at least 0.1% by weight, preferably 0.5 to 6% by weight, based on the total weight of the mixture of plastics and filler, of one or more metal powders, selected from aluminum powder, magnesium powder, zinc powder and manganese powder.

DESCRIPTION OF THE PREFERRED EMBODIMENTS

The thermoplastics used according to the invention include polyolefins, polyamides, polyesters, polyvinyl chloride, polyvinylidene chloride, polyurethanes and polycarbonates, in each case in the form of a film or sheet. They also include compound films and sheets (composite films and sheets) obtained, for example, by joint extrusion of at least two of the aforementioned polymers. The preferred thermoplastics film or the preferred thermoplastics sheet comprises preferably a film or a sheet of a polyolefin, polyester or polyamide. Films and sheets of this kind are known and are available in a wide variety on the market.

These kinds of polyolefin films are produced according to known processes (blowing processes, chill-roll processes etc.) from granules of homopolymers of ethylene and propylene and copolymers. Polyethylene of low density (PE-LD), of medium density (PE-MD), of high density (PE-HD), linear low and linear very low density polyethylene (PE-LLD, PE-VLD), polypropylene, its copolymers with ethylene and the copolymers of ethylene with one or more comonomers from the groups of vinyl esters, vinylalkylethers, unsaturated mono- and dicarboxylic acids, salts, anhydrides and esters thereof can be mentioned.

These polyolefins are available commercially under the following trade names: Escorene®, Lupolen®, Lotader®, Lacqtene®, Orevac®, Lucalen®, Dowlex®, Primacore, Surlyn®, Admer®, Novatec®, Sclair®, Stamylan®, inter alia.

Examples of polyamides suitable for thermoplastics are polyamide 6 (polyamide prepared from ε-aminocaproic acid), polyamide 6,6 (polyamide prepared from hexamethylenediamine and sebacic acid), polyamide 66,6 (mixed polyamide consisting of polyamide 6 and polyamide 6,6), polyamide 11 (polyamide prepared from ω-aminoundecanoic acid) and polyamide 12 (polyamide prepared from ω-aminolauric acid or from lauryl lactam). Examples of commercial products are Grilon®, Sniamid®, and Ultramid®.

Polyesters preferably fused are polyethylene terephthalate, polybutylene terephthalate and polyesters based on terephthalic acid, ethylene and butylene glycol. Other polyesters based on terephthalic acid, isophthalic acid and phthalic acid and various polyols such as, for example, polyethylene glycol and polytetramethylene glycols of different degrees of polymerization are also suitable however.

Examples for suitable commercial products are Hostaphan®, Melinex®, Hostadur® and Ultradur®.

An example of a suitable commercial product based on polyurethane is Elastolan® of BASF AG.

According to the application the thermoplastics films contain at least 0.1% by weight, based on the total weight of the mixture of plastics and filler, of metal powders. A content of 0.5 to 6% by weight of metal powders, based on the total weight of the mixture of plastic and filler, is preferred. Depending on the application purpose contents of more than 6% by weight, based on the total weight of the mixture of plastic and metal filler, can be sensible. In general, however, contents of up to 6% by weight are adequate.

Aluminum powder is preferably used as metal powder. The aluminum powder is for example available under the designation "Aluminiumpulver Glanzschliff Lotos Vollton" (from Eckart-Werke). Preferably the average particle size of the aluminum powder and the other metal powders is in the range of 5 to 20 µm, however exceptions are also possible.

The plastics films can also contain expedient additives such as lubricants, stabilizers, colorants, pigments, antistatic agents, antiblocking agents and the like in an amount effective in each case.

The invention also relates to the process for producing the thermoplastics films containing the metal powders. In this the thermoplastic is mixed with the metal powder and extruded to form a plastics film. The extrusion of plastics is a well-known process. In working with the metal powders, care is advisable regarding the existing explosion hazards. It is advantageous to introduce the metal powder into the plastics melt by side-feeding the extruder. Depending on the quantity of metal powder used it is also advisable for safety reasons to carry out a devolatilization of the extruder. Preferably twin screw extruders are used. It is preferred to carry out a multi-stage extrusion to produce the plastics films, the metal powder being extruded together with a part of the plastics to produce a film with a high metal powder content in the first extrusion stage and in the second stage the granules obtained from the film being extruded with further thermoplastics. In this manner a better homogenization of the mixture of plastics and metal powder is achieved.

The thickness of the thermoplastics sheets containing metal powders is generally 15 to 200 µm, preferably 20 to 100 µm.

The present invention also relates to metal/plastics composites containing inorganic fillers, which composites are characterized in that thermoplastics films bonded to a metal sheet, contain at least 0.1% by weight, preferably 0.5 to 6% by weight, based on the total weight of the mixture of plastics and filler, of one or more metal powders selected from aluminum powder, magnesium powder, zinc powder and manganese powder.

However, the metal powders can also be contained in the adhesion promoter layer or in the adhesive layer disposed between the plastics film and the metal sheet. The present invention thus relates also to metal/plastics composites, which are characterized in that an adhesion promoter layer bonding a thermoplastics film to a metal sheet contains at least 0.1% by weight, preferably 0.5 to 6% by weight, based on the total weight of the mixture of adhesion promoter and filler, of one or more of the abovementioned metal powders. Furthermore, the present invention relates to metal/plastics composites, which are characterized in that an adhesive layer disposed between a metal sheet and a plastics film contains at least 0.1% by weight, preferably 0.5 to 6% by weight, based on the total weight of the mixture of filler and the non-volatile weight of the adhesive layer, of the abovementioned metal powders.

The average particle size of the metal powders is preferably in the range of 5 to 20 µm. Preferably aluminum powder is used as metal powder. A suitable Al powder is available, for example, under the designation "Aluminiumpulver Glanzschliff. Lotos Vollton" (from Eckart-Werke).

In order to produce the coated metal sheets, sheets of a thickness from 0.04 to 1 mm of black plate, tinplate, aluminum and various ferrous alloys, which if desired are provided with a passivation coating based on nickel compounds, chromium compounds and zinc compounds are suitable. Depending on the purpose of use thicknesses of more than 1 mm are also suitable.

The thermoplastic resin films or sheets used as top layer according to the invention include polyolefins, polyamides, polyesters, polyvinyl chloride, polyvinylidene chloride, polyurethanes and polycarbonates, in each case in the form of a film or of a sheet. They also include compound films and sheets (composite film and sheets), which are obtained, for example, by joint extrusion of at least two of the aforementioned polymers. The preferred thermoplastics film or the preferred thermoplastics sheet, which film (sheet) forms the innermost layer (this is the layer in contact with the filled goods) of the metal composites, preferably comprises a film or a sheet of a polyolefin, polyester of polyamide. Films and sheets of this kind are known and available in a wide variety on the market.

Polyolefin films of this type are produced according to known processes (blowing processes, chill-roll processes etc.) from granules of homopolymers of ethylene and propylene and copolymers. Polyethylene of low density (PE-LD), of medium density (PE-MD), of high density (PE-HD), linear low and linear very low density polyethylene (PE-LLD, PE-VLD), polypropylene, its copolymers with ethylene and the copolymers of ethylene with one or more comonomers from the groups of vinyl esters, vinylalkylethers, unsaturated mono- and dicarboxylic acids, salts, anhydrides and esters thereof can be mentioned.

These polyolefins are available commercially under the following trade names: Escorene®, Lupolen®, Lotader®, Lacqtene®, Orevac®, Lucalen®, Dowlex®, Primacor®, Surlyn®, Admer®, Novatee®, Sclair®, Stamylan®, inter alia.

Examples of polyamides suitable for top layer are polyamide 6 (polyamide prepared from ε-aminocaproic acid), polyamide 6,6 (polyamide prepared from hexamethylenediamine and sebacic acid), polyamide 66,6 (mixed polyamide consisting of polyamide 6 and polyamide 6,6), polyamide 11 (polyamide prepared from ω-aminoundecanoic acid) and polyamide 12 (polyamide prepared from ω-aminolauric acid or from lauryl lactam). Examples of commercial products are Grilon®, Sniamid®, and Ultramid®.

Polyesters preferably used are polyethylene terephthalate, polybutylene terephthalate and polyesters based on terephthalic acid, ethylene and butylene glycol. Other polyesters based on terephthalic acid, isophthalic acid and phthalic acid and various polyols such as, for example, polyethylene glycol and polytetramethylene glycols of different degrees of polymerization are also suitable however.

Examples for suitable commercial products are Hostaphan®, Melinex®, Hostadur® and Ultradur®.

An example of a suitable commercial product based on polyurethane is Elastolan® of BASF AG.

Adhesion promoters, in contrast to adhesives, are understood as meaning solid adhesion promoting plastics, which are coextruded together with the thermoplastics and formed into an adhesion promoting layer on the inner side of the coextruded plastics film.

Adhesion promoters can be copolymers, terpolymers, graft copolymers and ionomers, with the proviso that they have carboxyl groups or anhydride groups or groups that are hydrolyzable to carboxyl groups and that the melt flow index of the polymers measured at 190° C. and a loading of 2.16 kg is between 0.1 and 30 g/10 min, preferably between 0.2 and 25 g/10 min and especially preferably between 0.5 and 20 g/10 min.

Suitable copolymers or terpolymers can be produced by copolymerization of ethylene with $\alpha,\beta$-unsaturated carboxylic acids such as, for example, acrylic acid, methacrylic acid, itaconic acid, crotonic acid, isocrotonic acid, maleic acid and fumaric acid, the corresponding anhydrides or the corresponding esters or semiesters with 1 to 8 C atoms in the alcohol radical such as, for example, the methyl-, ethyl-, propyl-, butyl-, pentyl-, hexyl-, cyclohexyl-, heptyl-, octyl- and 2-ethylhexylesters of the aforementioned acids. The corresponding salts of the aforementioned carboxylic acids, such as the sodium, potassium, lithium, magnesium, calcium, zinc and ammonium salts can also be used. The carboxylic acids and their anhydrides are preferably used.

Furthermore, still other monomers copolymerizable with ethylene and the unsaturated carbonyl compounds can be used in the copolymerization. For example, alpha olefins with 3 to 10 C atoms, vinyl acetate and vinyl propionate are suitable.

Here, the quantities of the monomers used are chosen such that the corresponding polymer has a carboxyl group content of 0.1 to 30% by weight, preferably 2 to 20% by weight, and that the content of ethylene units in the polymer is up to 99.9% by weight, preferably between 75 and 95% by weight.

Suitable graft-copolymers can be prepared by grafting at least one polymer from the group of the polyolefins with up to 10% by weight, preferably up to 5% by weight, based on the total weight of the monomers, of at least one monomer from the group of $\alpha,\beta$-unsaturated carboxylic acids, the anhydrides thereof, the esters or salts thereof in the presence or absence of peroxides. Examples of suitable polyolefins are the polyolefins already mentioned in the description of the top layers of this description. Examples of suitable carbonyl compounds are the carbonyl compounds based on copolymers mentioned above in the description of the adhesion promoter.

The ionomers used as adhesion promoter layer can be prepared by the copolymerization already described above of ethylene and, if required, further monomers with salts of $\alpha,\beta$-unsaturated carboxylic acids or by partial neutralization of the carboxylic acid containing copolymers, terpolymers and graft polymers already mentioned above with salts, oxides and hydroxides of sodium, potassium, lithium, magnesium, calcium, zinc and ammonium. The neutralization can be carried out in the melt or in solution. The quantity of basic compound is here chosen such that the degree of neutralization of the polymer is between 0.1 and 99%, preferably between 0.1 and 75% and very particularly preferably between 0.1 and 40%.

Adhesion promoters based on polyurethane are also suitable.

Both the adhesion promoter layer and the thermoplastics layer can also contain conventional additives such as, for example, internal and external lubricants, anti-blocking agents, stabilizers, anti-oxidants, pigments, crystallization auxiliaries and the like. These additives are used in the form of powders, dusts, beads or a concentrate incorporated directly into the corresponding polymer in the quantities necessary for the production, processing, fabrication and use. More details of the quantities conventionally used and examples of suitable additives can be found, for example, in Gächter-Müller, Kunststoffadditive, Carl-Hanser Verlag. These additives are preferably incorporated into the thermoplastics layer.

The adhesives, used if required, are preferably applied by application from solutions or dispersions in water or organic solvents. The solutions or the dispersions as a rule have an adhesive content of approximately 5 to 60% by weight. The amount of adhesive applied is as a rule about 1 to 10 g/m$^2$ of surface area. Specially suitable adhesives are the synthetic adhesives, consisting of thermoplastic resins such as cellulose esters, cellulose ethers, alkyl- or acrylesters, polyamides, polyurethanes and polyesters, of heat-curing resins such as epoxy resins, urea/formaldehyde resins, phenol/formaldehyde resins and melamine/formaldehyde resins or of synthetic rubbers.

The present invention also relates to several processes for producing the metal/plastics composites according to the invention.

Thus, a production process is characterized by the fact that the mixture of thermoplastics and metal powder is extruded and the resulting plastics film is laminated onto the metal sheet by means of an adhesive layer. Furthermore, however, the mixture of thermoplastics and metal powder can also be coextruded together with an adhesion promoter. In this process an adhesion promoter layer is formed on the inner side of the plastics film containing the metal powder. Subsequently the plastics film obtained is laminated onto a metal sheet.

In addition, however, a process for producing the metal/plastics composites is possible, in which the thermoplastics are coextruded together with a mixture of adhesion promoter and metal powder, a metal sheet is heated and the plastics film is laminated onto the metal sheet.

Finally, the present invention relates to a production process for metal/plastics composites in which the plastics film obtained by extrusion is laminated onto the metal sheet by means of an adhesive layer, which contains the metal powder.

The process for producing the metal sheets coated with a plastics film are generally known so that this need not be dealt with in greater detail here.

Regarding suitable adhesives and adhesion promoters reference is made to the above-described adhesives and adhesion promoters.

The plastics films and metal/plastics composites according to the invention have outstanding barrier properties even without biaxial orientation of the plastics films, ie. a low light transmission, and a low water vapor and gas permeability. They are therefore outstandingly suitable for packaging of foodstuffs and semi-luxury goods and are preferably used for packaging oxidation-sensitive foodstuffs and semi-luxury goods.

The invention is explained in greater detail in the following with the aid of exemplary embodiments:

EXAMPLE 1

Polypropylene granules (Novolen 3225 MCX of BASF AG) are mixed with 0.1, 0.5, 1, 2, 4, 6, 8 and 10% by weight of aluminum powder, based on the total weight of polypropylene and Al powder, (warning: explosion hazard) and melted at approximately 180° C. roll temperature (two-roll unit) and homogenized. The mixtures are pressed to form films and laminated by means of a 2-component polyurethane adhesive or an adhesion promoter (adhesion promoter based on polypropylene grafted with maleic acid anhydride) onto tinplate and stamped to form preserve cans or lids.

The thickness of the films was varied and is 30, 50, 100, 200 μm.

Several preserve cans and lids, which are coated with film on one or two sides, are produced and filled with various solutions, such as, for example, NaCl, vinegar, NaCl and vinegar, lactic acid solution, petfood (Chappie, Sheba), tomato purée and the like and sealed. The preserve cans are sterilized at 121° C. for 30 minutes or at 130° C. for 1 hour, opened and subsequently inspected for marbling (black coloration of the metal) and for any occurrence of corrosion phenomena.

Result: in all tests no marbling and no corrosion phenomena were found, whilst during the corresponding experiments without aluminum powder, significant marbling phenomena are apparent.

EXAMPLE 2

The procedure is followed as in Example 1 with the difference that the aluminum powder is not mixed with the polypropylene granules but is metered into the polypropylene melt with the aid of an automatic powder metering device during the extrusion. In this mode of operation an explosion is not possible. The results regarding marbling or corrosion phenomena correspond to the results from Example 1.

EXAMPLE 3

The procedure is followed as in Example 1 with the difference that instead of the polypropylene Novolen 3225 MCX of BASF AG, a 1:1 mixture of the polypropylene Novolen 1100 and Novolen 1125 (both from BASF AG) is used.

The results regarding marbling or corrosion correspond to the results from Examples 1 and 2.

EXAMPLE 4

Monofilms and coextrusion films consisting of several layers are produced, the polyethylene Lupolen® (BASF AG), the polypropylene Novolen® 1100 and 1125 (1:1; BASF AG), the polyamide Ultramid® (BASF AG), the polybutylene terephthalate Ultradur® B (BASF AG) and mixtures being used as backing materials in the coextrusion films. The material known under the trade designation Lucalen® (BASF AG) being coextruded as adhesion promoter together with the backing material. Aluminum powder is incorporated in proportions of 0.1, 0.5, 1.0, 2.0, 4.0, 6.0 and 8% by weight, based on the total weight of backing material and aluminum powder or on adhesion promoter and aluminum powder, both into the backing layers and into the adhesion promoters. The films laminated onto tinplate are in each case punched to form preserve cans. The preserve cans are filled with the solutions mentioned in Example 1 and sealed. The cans were sterilized at 121° C. for 30 minutes or at 130° C. for 1 hour, opened and inspected for marbling or corrosion phenomena.

Result: in all tests no marbling or no corrosion phenomena are found, whereas with corresponding tests without aluminum distinct marbling phenomena can be found.

We claim:

1. Metal/plastics composite containing inorganic fillers, characterized in that a thermoplastics film selected from the group consisting of polyolefins, polyamides, polyesters, polyvinyl chloride, polyvinylidene chloride, polyurethanes and polycarbonates and bonded to a metal sheet of a thickness from 0.04 to 1 mm contains between 0.1% to 6% by weight, based on the total weight of the mixture of thermoplastics and filler, of at least one metal powder, selected from the group consisting of aluminum powder, magnesium powder, zinc powder, manganese powder and mixtures thereof, where the average particle size of the metal powder is in the range of 5 to 20 μm.

2. Metal/plastics composite containing inorganic fillers, according to claim 1, further comprising an adhesive layer disposed between the metal sheet and the plastics film, wherein the adhesive layer contains 0.1% to 6% by weight, based on the total weight of the mixture of filler and the non-volatile weight of the adhesive layer, of one or more of the metal powders.

3. Process for producing the metal/plastics composite according to claim 1, characterized in that either the mixture of thermoplastics and metal powder is extruded and the resulting plastics film is laminated onto the metal sheet by means of an adhesive layer or the mixture of thermoplastics and metal powder is coextruded together with an adhesion promoter, the metal sheet is heated and the plastics film is laminated onto the metal sheet.

4. Process for producing the metal/plastics composite according to claim 1, characterized in that a thermoplastic is coextruded together with a mixture of adhesion promoter and metal powder, the metal sheet is heated and the plastics film is laminated onto the metal sheet.

5. Process for producing the metal/plastics composite according to claim 2, characterized in that the plastics film obtained by extrusion is laminated onto the metal sheet by means of an adhesive layer, which contains the metal powder.

6. Packaging containers comprising the metal/plastics composites according to claim 2.

* * * * *